United States Patent [19]

Ferm

[11] 4,193,811
[45] Mar. 18, 1980

[54] CONCRETE COMPOSITION

[75] Inventor: Richard L. Ferm, Lafayette, Calif.

[73] Assignee: Chevron Research Company, San Francisco, Calif.

[21] Appl. No.: 938,668

[22] Filed: Aug. 31, 1978

[51] Int. Cl.$^2$ ................................................. C04B 7/02
[52] U.S. Cl. ..................................................... 106/97
[58] Field of Search ........................................... 106/97

[56] References Cited

U.S. PATENT DOCUMENTS

| | | | |
|---|---|---|---|
| 2,962,467 | 11/1960 | Wagner et al. | 106/90 |
| 3,972,969 | 8/1976 | Rio et al. | 264/333 |

*Primary Examiner*—Delbert E. Gantz
*Assistant Examiner*—Mark Bell
*Attorney, Agent, or Firm*—D. A. Newell

[57] ABSTRACT

High-strength concrete comprises aggregate, portland cement and alkali metal or alkaline earth metal polysulfides.

8 Claims, No Drawings

CONCRETE COMPOSITION

BACKGROUND OF THE INVENTION

1. Field of the Invention

This application relates to portland cement concrete of increased strength. Further, it relates to concrete which achieves high strength with reduced contents of portland cement.

Portland cement concrete has become the world's largest bulk building material. The concrete comprises an admixture of portland cement with sand and aggregate (gravel or crushed stone). It is generally formed by mixing portland cement, water, sand and gravel or crushed stone, and allowing the mixture to harden to form a dense structure. The character of the "paste" mixture of water and cement is generally held to determine the important engineering properties of the concrete.

Construction concrete is generally formulated to contain from about 5 to 30 weight percent cement based upon the dry weight of materials. Generally, higher cement content (in the upper range of the usual content) produces concrete of higher strength.

Recently, shortages of cement in many parts of the world make particularly attractive the prospects of supplying concrete of low cement content which has high strength.

2. Description of the Prior Art

Polymer cements and polymer-impregnated concretes are known. The former usually contain a latex such as polyvinyl chloride, polyvinyl acetate, acrylonitrite-butadiene-styrene, etc., or an acrylic in solid or liquid form.

U.S. Pat. No. 2,820,713 discloses mortar compositions containing minor amounts of methyl cellulose and alkaline earth polysulfides and/or bunte salts as adhesion improvers.

U.S. Pat. Nos. 2,962,467 and 3,198,644 disclose similar mortar compositions.

"Characteristics of Portland Cement from the Gypsum-Sulfuric Acid Process" by Fredrich Wolfe and Joachim Hille (Silikattechnik, 1967, 1812), pages 55–57, discusses the effect on certain portland cements by the addition of calcium sulfide ($Ca_2S$).

SUMMARY OF THE INVENTION

It has now been found that high-strength concrete comprises aggregate, from about 6 to 15 weight percent portland cement, based upon the dry aggregate, and from about 1.5 to 6 weight percent alkali metal or alkaline earth metal polysulfide, based upon dry aggregate.

DESCRIPTION OF THE PREFERRED EMBODIMENTS

Standard portland cement-concrete compositions contain about 17 to 25 weight percent cement, with the remainder being a combination of fine and coarse aggregate (sand and gravel or crushed stone). It has been found that addition of the polysulfides to concretes of these types results in no gain in strength.

The alkali metal or alkaline earth metal polysulfide, preferably calcium polysulfide, is blended with the cement and aggregate at the time of mixing. The calcium polysulfides are articles of commerce and are conventionally prepared by the reaction of sulfur with lime water. Other polysulfides such as barium polysulfide are produced in a similar manner. Their preparation is described one page 63 of "A Text-Book of Organic Chemistry", Vol. III, Part I, edited by J. Newton Friend, Charles Griffin and Co., London, 1925. For agricultural purposes, they are conventionally sold as concentrated aqueous solutions, e.g., about 30 weight percent $CaS_x$.

Thus, in preparing the concretes, substitution of a calcium polysulfide ($CaS_x$) solution containing the appropriate amount of water for the desired water/cement ratio in the concrete will be the most suitable method. Otherwise, preparation of the concrete mix is by conventional means. There are several methods for determining proper water/cement ratios, etc. These are described in "Portland Cement and Asphalt Concretes", Thomas D. Larson, McGraw-Hill Book Co., Inc. (New York, 1963), pages 85–99.

The ratio of cement to polysulfide in the composition will preferably be in the range of about 4:1 to about 2:1.

The aggregates used in preparing the concrete are preferably those defined in ANSI/ASTM-C-33-77 for fine and coarse aggregates. The ratio of coarse-to-fine aggregate will range from about 1:2 to 7:1, preferably 1:1 to 4:1.

EXAMPLES

The following examples illustrate the invention. The examples are illustrative only and are non-limiting.

EXAMPLE 1

Portland cement, aggregate and water mixes were prepared, mixed and formed into cylinders and wet-cured for 28 days. Lime-sulfur (calcium polysulfide) solution was added to certain of the mixes in various concentrations. The aggregate employed was a mixture of sand and gravel having the following screen analysis:

TABLE I

| Mesh Size | Percent Retained |
|---|---|
| ¼" | 6.8 |
| 10 | 16.9 |
| 20 | 26.8 |
| 40 | 23.8 |
| 80 | 18.9 |
| 100 | 1.2 |
| (Passing 100) | 5.5 |

The cement, aggregate, water and a 29 weight percent calcium polysulfide solution were blended as follows:

TABLE II

| Material, grams | Sample 1 | 2 | 3 | 4 | 5 | 6 | 7 |
|---|---|---|---|---|---|---|---|
| Aggregate | 1800 | 1800 | 1800 | 1700 | 1700 | 1700 | 1700 |
| Cement | 200 | 200 | 200 | 300 | 300 | 300 | 300 |
| $CaS_x$ Solution | — | 100 | 200 | — | 100 | 200 | 300 |
| Water | 250 | 150 | 50 | 250 | 150 | 50 | 0 |

The cylinders were 3" in diameter and 6" high. After the wet-curing periods, 3 cylinders of each composition were broken on a Baldwin press, giving the following breaking points:

TABLE III

| | Compressive Strength | |
|---|---|---|
| Sample | After 28-Day Wet Cure Breaking Pressure, lbs. | After 90-Day Wet Cure Breaking Pressure, lbs |
| 1 | 5,900 | 5,056 |

TABLE III-continued

| | Compressive Strength | |
|---|---|---|
| Sample | After 28-Day Wet Cure Breaking Pressure, lbs. | After 90-Day Wet Cure Breaking Pressure, lbs |
| 2 | 8,873 | 8,375 |
| 3 | 12,466 | 13,133 |
| 4 | 17,733 | 23,467 |
| 5 | 16,266 | 19,433 |
| 6 | 17,433 | 21,583 |
| 7 | 17,733 | 20,100 |

These data show the significant increase in strength achieved with the concrete mix containing low cement content. No effect or lessening in strength was observed on the samples containing 17% cement based on dry aggregate, i.e., samples 5, 6 and 7.

EXAMPLE 2

Following the procedure of Example 1 with a commercially available "ready mix" concrete, samples were prepared with various amounts of calcium polysulfide. The ready mix contained about 10.1% by weight Type I portland cement (based on aggregate). The ready mix was screened and the following proportions of materials were obtained. The cement, of course, was included in the screening, accounting for the large amount of material passing 100 mesh.

TABLE IV

| Screen Analysis of Ready Mix Concrete | |
|---|---|
| Mesh Size | Wt. % Retained |
| ⅜" | 17.8 |
| 10 | 14.7 |
| 20 | 24.4 |
| 40 | 15.1 |
| 80 | 11.3 |
| 100 | 0.1 |
| Passing 100 | 16.5 |

The mixes were prepared by mixing 91% weight ready mix with 9% weight total liquid (water and/or 29% $CaS_x$ solution). The following mixes were prepared:

TABLE V

| Ready Mix Concrete with Calcium Polysulfide | | | | | | |
|---|---|---|---|---|---|---|
| | Sample | | | | | |
| Material | 1 | 2 | 3 | 4 | 5 | 6 |
| H₂O | 9 | 8 | 6 | 4 | 2 | 0 |
| Calcium Polysulfide, wt. % (29% solution) | 0 | 1 | 3 | 5 | 7 | 9 |

The compressive strength of the samples after 7 and 28 days wet cure is set forth in Table VI.

TABLE VI

| Compressive | Sample | | | | | |
|---|---|---|---|---|---|---|
| Strength (PSI) | 1 | 2 | 3 | 4 | 5 | 6 |
| After 7 days wet cure | 758 | 791 | 942 | 1200 | 1633 | 2317 |
| After 28 days wet cure | 2308 | 2483 | 2708 | 2883 | 3208 | 2680 |

There is a substantial early development in compressive strength and a significant increase in the 28-day cure materials.

Although many specific embodiments of the invention have been described in detail, it should be understood that the invention is to be given the broadest possible interpretation within the terms of the following claims.

What is claimed is:

1. A concrete composition comprising a major portion of aggregate, from about 6 to 15% by weight portland cement based on aggregate, and from 1.5 to 6% based on aggregate of an alkali metal or alkaline earth metal polysulfide.

2. The composition of claim 1 in which the polysulfide is calcium polysulfide.

3. The composition of claim 2 in which the ratio of coarse to fine aggregate is in the range of 1:1 to 4:1.

4. The composition of claim 2 in which the weight ratio of cement to polysulfide is from about 4:1 to about 2:1.

5. A concrete composition consisting essentially of about 6 to 15% of Portland cement and from 1.5 to 6% of an alkali metal or alkaline earth metal polysulfide, the remainder comprising a combination of fine and coarse aggregate, said percentages, being based by weight, upon said aggregate.

6. The composition of claim 5 wherein said polysulfide is calcium polysulfide.

7. The composition of claim 5 wherein said aggregate is a mixture of coarse and fine aggregate having a weight ratio of the former to the latter in the range of from about 1:1 to 4:1.

8. The composition of claim 5 having a weight ratio of said cement to said polysulfide in the ratio of from about 4:1 to about 2:1.

* * * * *